United States Patent [19]
Jahrens et al.

[11] Patent Number: 5,642,697
[45] Date of Patent: Jul. 1, 1997

[54] INTAKE MANIFOLD FOR AN INTERNAL COMBUSTION ENGINE

[75] Inventors: Hans-Ulrich Jahrens, Braunschweig; Günter Söhlke, Gifhorn, both of Germany

[73] Assignee: Volkswagen AG, Wolfsburg, Germany

[21] Appl. No.: 659,436

[22] Filed: Jun. 6, 1996

[30] Foreign Application Priority Data

Jun. 7, 1995 [DE] Germany ............ 195 20 667.3

[51] Int. Cl.$^6$ .............. F02B 27/02; F02M 35/10
[52] U.S. Cl. ................. 123/184.21; 123/184.61
[58] Field of Search ............ 123/184.21, 184.24, 123/184.42, 184.47, 184.61

[56] References Cited

U.S. PATENT DOCUMENTS

| | | | |
|---|---|---|---|
| 4,111,163 | 9/1978 | Ederer et al. | 123/184.42 |
| 5,150,669 | 9/1992 | Rush et al. | 123/184.42 |
| 5,575,249 | 11/1996 | Mielke | 123/184.61 |

FOREIGN PATENT DOCUMENTS

| | | |
|---|---|---|
| 613999 | 11/1993 | European Pat. Off. |
| 89140494 U | 11/1989 | Germany . |
| 4329544 | 9/1993 | Germany . |
| 4401690 | 1/1994 | Germany . |
| 2174454 | 5/1985 | United Kingdom . |

*Primary Examiner*—Marguerite McMahon
*Attorney, Agent, or Firm*—Brumbaugh, Graves, Donohue & Raymond

[57] ABSTRACT

An intake manifold is formed by two half-shells into which inserts are mounted to form intake ducts. To adapt the manifold to internal combustion engines of differing displacements and to achieve sealing of the intake ducts relative to an air-collecting region, the inserts are inserted into a half-shell with an overlap between adjacent parallel wall sections and the extent of the overlap is selected according to the desired cross-sectional area of the ducts. Sealing of the intake ducts is accomplished by providing seals along flanges which are spaced from the intake duct by a distance corresponding to the overlap of the parallel wall sections.

11 Claims, 7 Drawing Sheets

INTAKE MANIFOLD FOR AN INTERNAL COMBUSTION ENGINE

BACKGROUND OF THE INVENTION

This invention relates to intake manifolds for internal combustion engines.

German Patent Gebrauchsmuster No. 89 14 049 discloses an intake manifold for an internal combustion engine in which the inner walls of individual intake pipes are formed by a separate part which is fitted into half-shells forming a manifold housing. The separate part can have a multi-part design, e.g. a design in which individual fitting parts are mounted together in the parting plane of the half-shells. This intake manifold is intended to provide economical manufacture and an improvement, which is not described in detail, resulting from smooth duct walls.

In such intake manifold arrangements, the seals between the inserted parts and the half-shells and between the individual inserted parts adjoining one another in the parting plane can present problems. Leaks occurring at these locations lead inevitably to losses in the volumetric efficiency in low to medium engine speed ranges requiring a high vacuum in the intake manifold.

SUMMARY OF THE INVENTION

Accordingly, it is an object of the present invention to provide an intake manifold for an internal combustion engine which overcomes the problems of the prior art.

Another object of the invention is to provide an improved intake manifold in which leaks in the walls of the individual intake pipes are avoided.

A further object of the invention is to provide an intake manifold permitting a high degree of variability such that it can be used with different internal combustion engines of a series with only slight modifications.

These and other objects of the invention are attained by providing an intake manifold assembled from half-shells which form the outer walls of the intake ducts and which provide parallel walls extending inwardly from the outer walls, and inserts received in the parallel walls to form the inner walls of the intake ducts and to provide ducts of appropriate size for different engines. In an intake manifold of this type, wherein the half-shells forming the outer pipe walls are provided on both sides of the each intake duct wall with wall sections essentially parallel to one another, it is thus possible to provide between the parallel wall sections an insert having corresponding wall sections, producing an overlap between adjacent wall sections of the half-shell and the insert.

The intake duct thereby formed has outer and inner pipe walls which are disposed opposite one another forming the duct cross-section. A seal is arranged between the mutually facing wall sections of the half-shell and the insert which is spaced at a distance from the intake duct corresponding to the extent of the wall overlap. This advantageously avoids positioning a seal directly between the pipe walls forming the intake duct, something which is difficult to manage in terms of production technology, since the seal is shifted to a region remote from the intake duct. Any small clearance volume formed between the opposing wall sections of the intake duct is not critical to the intake flow since it is sealed off by means of the seal.

In addition, an intake manifold arrangement according to the invention has the advantage that it is possible to provide intake duct cross-sections of different sizes by changing the extent of wall overlap while retaining most of the same components of the manifold system. It is furthermore possible to change the cross-section of an intake duct in a simple manner by changing the length of the intake-duct-forming pipe wall on the insert. In this way the intake-duct length and intake-duct cross-section of the intake manifold can be adapted in a variable manner to different internal combustion engines which, for example, have a different displacement.

In an advantageous embodiment, the duct inserts have an angled flange engaging the duct seal at the ends of their walls which are remote from the intake duct.

Each intake duct in the manifold is formed by the walls of two inserts in each of the half shells which adjoin one another in the parting plane between the half-shells, the inlet cross-section of the intake duct being arranged to receive air from an air-collecting region formed in one of the half-shells between the insert and that half-shell. In the other half-shell, which has an outlet flange that can be bolted to the cylinder head of an internal combustion engine, the inserts are formed in such a way that they are closed with respect to the air-collecting region and conduct the induced air from the parting plane to this outlet flange.

The joining of the half-shells and of the inserts adjoining one another in the parting plane, relative to one another, is accomplished by friction welding the mutually engaging parts of the half-shells. For this purpose, one of the half-shells has a receiving flange of U-shaped cross-section into which an insertion flange of the other part, which is provided with a projection, is received.

The seal between engaging wall sections is preferably made of a flexible material and can extend over the entire length of the intake ducts.

With this arrangement, leaks which could prejudice the volumetric efficiency of the internal combustion engine are completely avoided because of the sealing concept implemented in the manifold pipe system and a simple and economical adaptation of the manifold to different internal combustion engines is made possible by the selected use of different inserts with the half-shells. It is thereby possible to reduce costly redevelopment and recalculation of design implementations largely to the adaptation of the manifold structure with inserts.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 2:
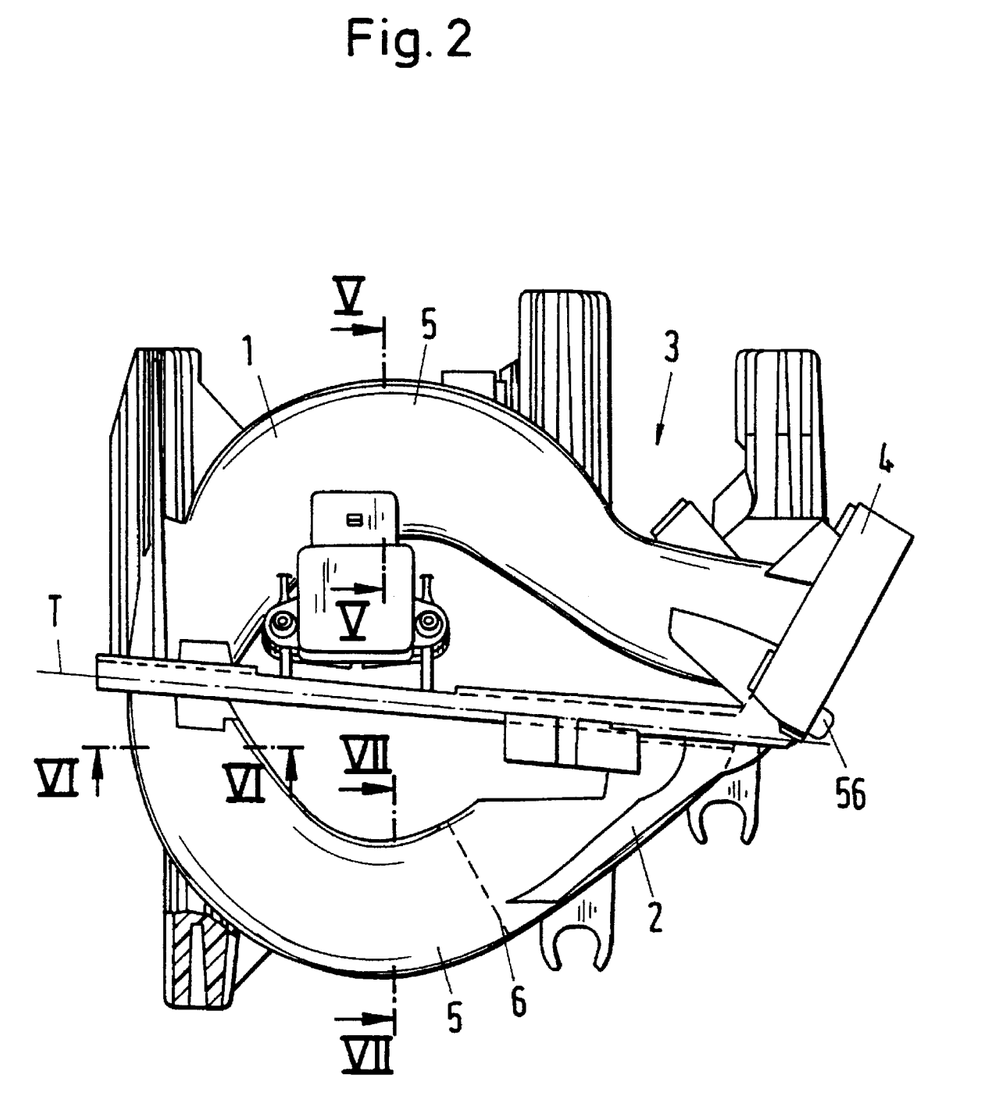
FIG. 2 is an elevation view of the manifold looking in the direction of arrow X in FIG. 1.
Figure 8:
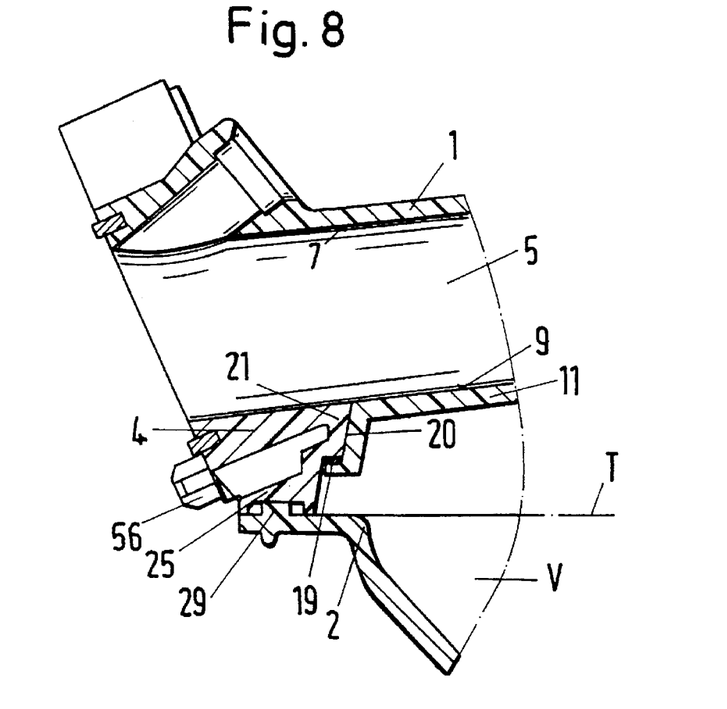
FIG. 8 is a fragmentary sectional view, taken along the line VIII—VIII in FIG. 2 and looking in the direction of the arrows.
Figure 9:
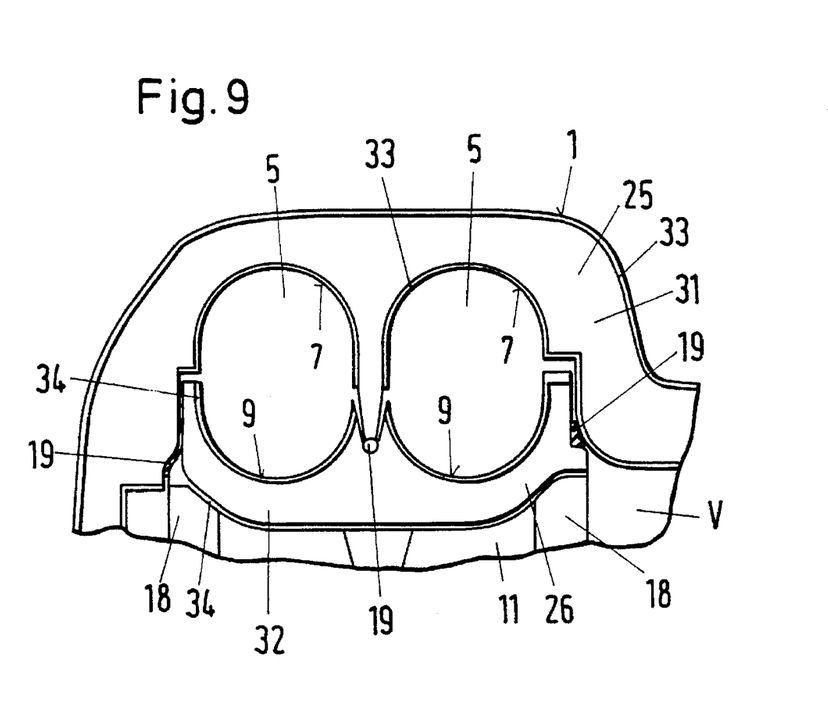
FIG. 9 is a fragmentary sectional view, taken along the line IX—IX in FIG. 3 and looking in the direction of the arrows.

In the representative embodiment of the invention shown in the drawings, a manifold for an internal combustion engine has on upper half-shell 1 and a lower half shell 2 which are joined along a common parting plane T as shown in FIG. 2. It will be understood, of course, that other orientations of the two half-shells are also possible. The half-shells 1 and 2 joined together provide a housing 3 in which a collecting region V for intake air is formed as shown in FIGS. 8 and 9.

Figure 5:
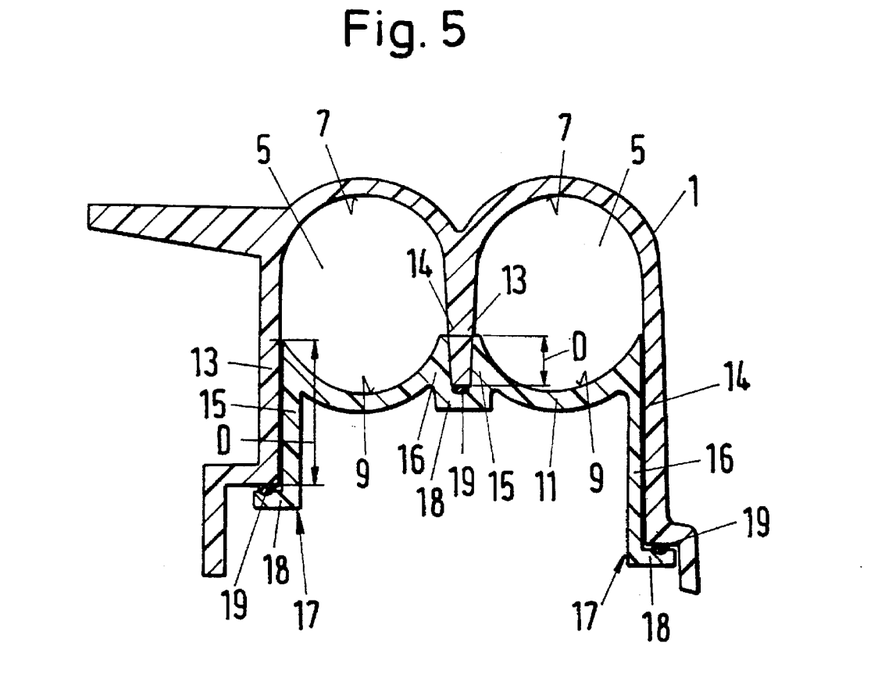
FIG. 5 is a fragmentary sectional view, taken along the line V—V in FIG. 2 and looking in the direction of the arrows.
Figure 6:
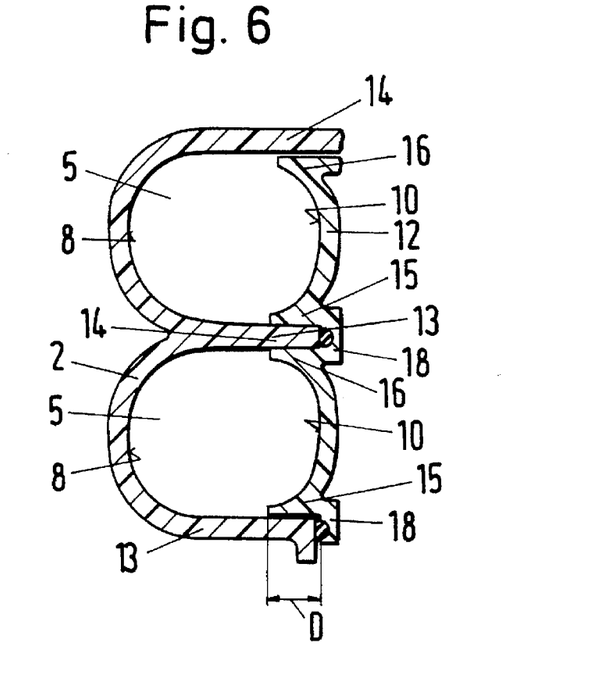
FIG. 6 is a fragmentary sectional view, taken along the line VI—VI in FIG. 2 and looking in the direction of the arrows.
Figure 7:
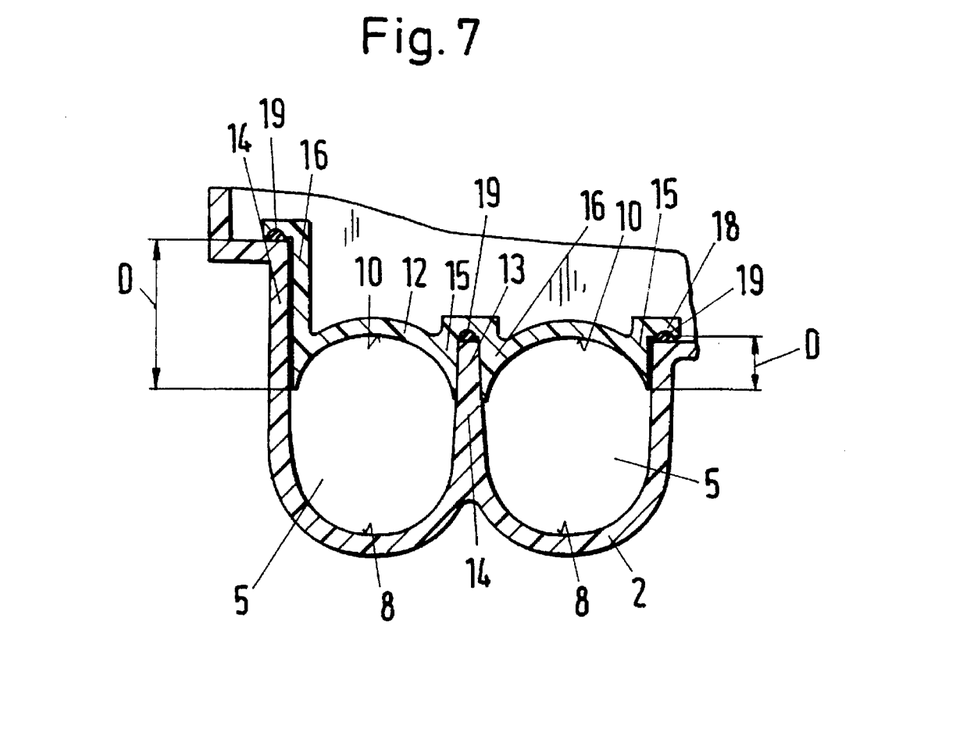
FIG. 7 is a fragmentary sectional view, taken along the line VII—VII in FIG. 2 and looking in the direction of the arrows.

On the inlet side of its cylinder head, an internal combustion engine (not shown) has a flange to which an outlet flange 4, formed on the upper half-shell 1, is fastened. Opening into this outlet flange 4 are four cylinder-specific tubular intake ducts 5 which are arranged within the housing 3 and are connected to the air-collecting region V within the lower half-shell 2 by an intake opening 6. As best seen in FIGS. 5 and 6, respective halves of walls forming the intake ducts 5 are in the form of outer pipe walls 7 and 8 formed integrally in the half-shells 1 and 2 and inner pipe walls 9 and 10 formed in inserts 11 and 12 which are mounted in the half-shells 1 and 2 respectively.

Both sides of the pipe walls 7 and 8 of the half-shells 1 and 2 are formed with wall sections 13 and 14 which extend essentially parallel to one another in the direction away from the ducts 5. On both sides of the pipe walls 9 and 10 of the inserts 11 and 12, wall sections 15 and 16 are formed corresponding to the wall sections 13 and 14 described above. The inserts 11 and 12 are inserted into the half-shells 1 and 2 respectively in such a way that an overlap D is in each case established between the mutually facing wall sections, e.g. the wall section 13 of the half-shell and the wall section 15 of the insert as shown in FIG. 5.

At the end 17 of this overlap D which is remote from the corresponding intake duct 5, the wall sections 15 and 16 are formed with angled flanges 18 which extend parallel to the intake duct 5.

Before the inserts 11 and 12 are inserted into the half-shells 1 and 2, a self-curing two-component seal 19 in the form of a conventional liquid foam is applied along the length of the flanges 18. After curing, this seal is both compressible and decompressible and is therefore suitable for the compensation of tolerances. The seal 19 is applied in the form of two essentially mutually parallel beads to the flanges 18 of the insert before it is inserted into the lower half-shell 2.

On the insert 11 for the upper half-shell 1, the seal 19 additionally extends transversely between the two beads which extend along the length of the flanges so that it lies across an end face 20 of the insert 11 which faces an inner wall 21 of the outlet flange 4.

The attachment and sealing of the components which are formed along the parting plane T is accomplished by friction welding. For this purpose, both of the half-shells 1 and 2 and the inserts 11 and 12 have receiving flanges 25 and 26 of U-shaped cross-section which face the parting plane T. The components facing the receiving flanges 25 and 26, i.e., the half-shell 2 and the insert 12, each have insertion flanges 27 and 28 which correspond to the receiving flanges and which are provided with projections 29 and 30 which engage the corresponding receiving flange 25 or 26.

Channels 31 and 32 formed by the U-shape of the receiving flanges 25 and 26 receive the projections 29 and 30 and these channels are made significantly wider than the corresponding projections. Receiving channels 35 thus formed between the projections 29 and 30 and the outer walls 33 and 34 of the receiving flanges 25 and 26 can accommodate the material displaced from the projections 29 and 30 by the friction-welding operation.

Figure 4:
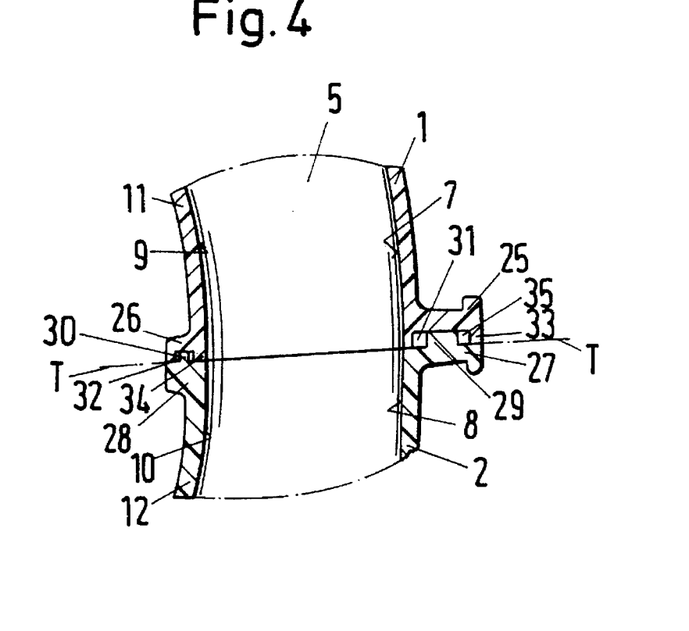
FIG. 4 is a fragmentary sectional view, taken along the line IV—IV in FIG. 1 and looking in the direction of the arrows.

As best seen in FIG. 4 and 9, the flanges 25 and 27 associated with the half-shells 1 and 2, respectively, are significantly wider than the flanges 26 and 28 associated with the inserts 11 and 12, respectively. The flanges 25 and 27 are designed so as to extend all the way around the housing 3 and, because of their wide configuration, they provide the entire housing 3 with high rigidity. The flanges 26 and 28 associated with the inserts 11 and 12 essentially provide only a sealing function and are therefore made correspondingly narrower.

Figure 10:
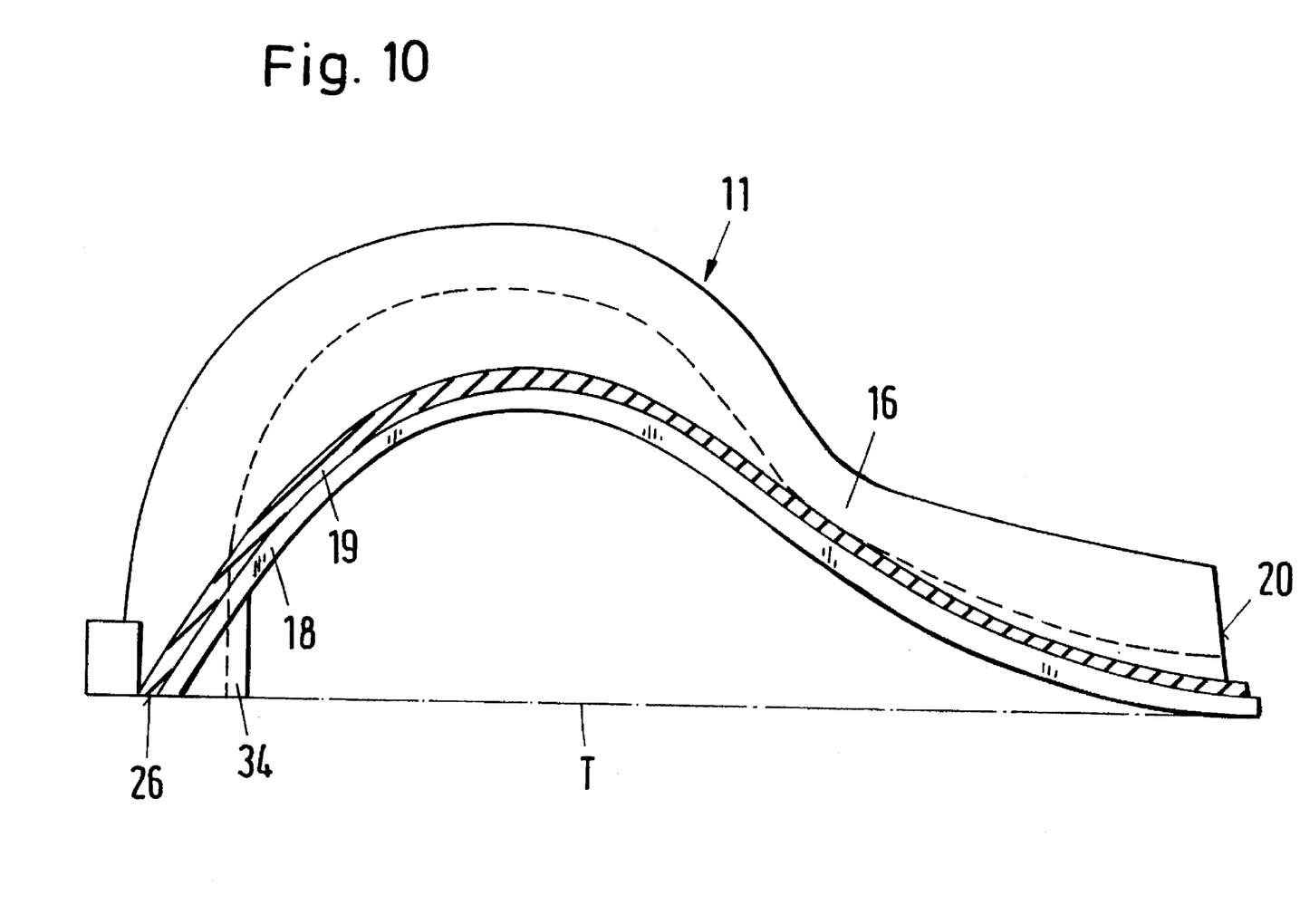
FIG. 10 is a side view of an insert used in the manifold shown in FIG. 1.

As shown in FIG. 10, the seal 19 extends in a direction substantially perpendicular to the parting plane T in the region of the receiving flange 26 while, as shown in FIG. 8, the bead of the seal 19 which extends along the end face 20 extends in a direction essentially parallel to the parting plane T. This means that the insert 11 is substantially unaffected by tolerance variations between the end face 20 and the wall 21 of the outlet flange 4. Slight dimensional variations between these two parts are compensated for by the compressible seal 19, and slight displacements of the insert 11 in the region of the receiving flange 26 present no problem.

The sealing between the insert 12 and the lower half-shell 2 is effected in a similar manner in the region of the parting plane T, the beads of the seal 19 extending from the parting plane T to the inlet opening 6, shown in FIG. 2, and ending at that point. Fresh air flowing in through an inlet opening 42 formed in a fastening flange 41 of the upper half-shell 1 passes from there into the air-collecting region V and is supplied from that region through openings 6 of the intake ducts 5 to the outlet flange 4 and hence to the individual cylinders of the internal combustion engine.

Adaptation of the intake manifold according to the invention to different capacity internal combustion engines of a series in a simple manner is made possible by altering the extent of the overlap D which defines the cross-sectional area of the intake ducts 5 by using inserts 11 an 12 having an appropriate wall length and by using inserts 12 which have a suitably positioned intake opening 6 relative to the parting plane T. The cross-sectional area and length of the intake ducts 5 are thereby adapted to the desired intake duct capacity. At the same time it is also possible to vary the volume of the air-collecting region V by appropriate configuration of the inserts 11 and 12.

To allow the greatest possible variation in the use of the intake manifold according to the invention on internal combustion engines having different levels of equipment, the housing 3 has a plurality of receptacles for the space-saving arrangement of add-on components.

Figure 1:
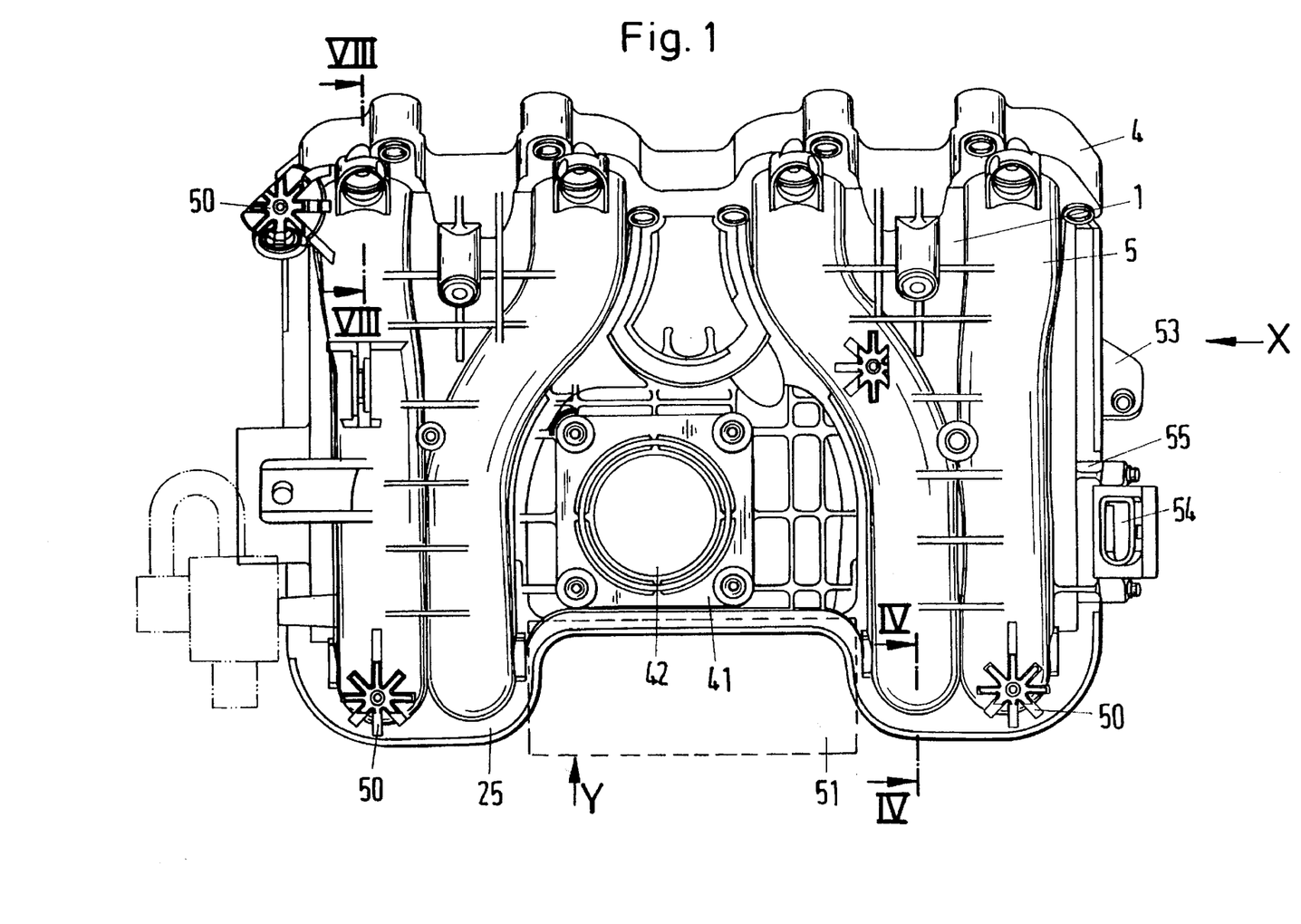
FIG. 1 is a plan view illustrating a representative embodiment of an intake manifold arranged according to the invention.
Figure 3:
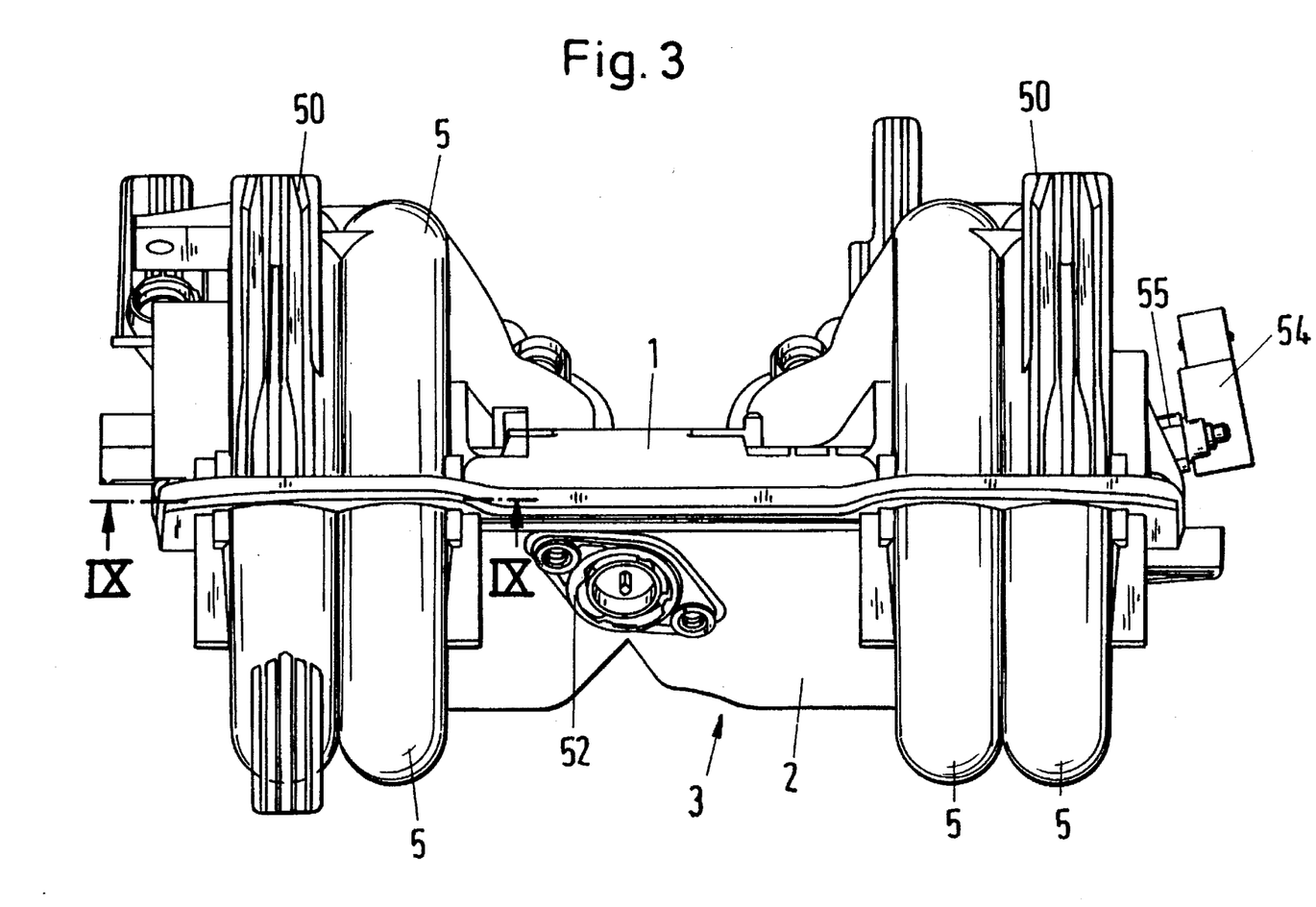
FIG. 3 is an elevation view of the manifold looking in the direction of arrow Y in FIG. 1.

It is, for instance, possible to mount an air filter on a set of finned tubes 50 which are formed integrally with the half-shell 1 as shown in FIGS. 1 and 3.

In the region of the receiving flange 41, which is subjected to vibration, the external encircling flanges 25 and 26 are drawn in between adjacent inner intake ducts 5 as shown in FIG. 1 and thus create installation space for the accommodation of a control device 51.

In region favorable for uniform distribution in the intake air, the lower half-shell 2 has a connection flange 52, shown in FIG. 3, for the introduction of recirculated exhaust gas into the intake air. A holder 53 arranged on the side of the housing 3 as shown in FIG. 1 guides a dipstick of the internal combustion engine, while a holder 55 which accommodates a pressure and temperature sensor 54 is positioned next to it.

For accurate alignment of the intake manifold on the cylinder head, the outlet flange 4 has integrally molded alignment pins 56, shown in FIG. 2, which engage corresponding receptacles in the cylinder head. This ensures exact alignment of the intake ducts with the corresponding ducts in the cylinder head.

In this exemplary embodiment, the inserts 11 and 12 are each designed for two intake ducts 5, but any desired modifications of the intake duct arrangement are possible.

The overall housing 3 is manufactured from plastic, the upper half-shell 1 being formed integrally with the outlet flange 4, the receiving flange 41, the holder 53, the holder 55 and further fixing devices. In the manifold for a four-cylinder internal combustion engine shown in the drawings, a total of only four inserts need to be provided and inserted in the half-shells in the manner described above. Fabrication of the entire manifold system in plastic additionally offers the advantage of smooth duct walls, which has a favorable effect on volumetric efficiency, as well as weight advantages.

Although the invention has been described herein with reference to specific embodiments, many modifications and variations therein will readily occur to those skilled in the art. Accordingly, all such variations and modifications are included within the intended scope of the invention.

We claim:

1. An intake manifold for an internal combustion engine comprising two half-shells joined along a common parting plane to provide a central air-collecting region and to form outer pipe walls of cylinder-specific tubular intake ducts, a plurality of inserts mounted in the half-shells providing inner pipe walls of the intake ducts which communicate with the central air-collecting region, each of the half-shells being formed on both sides of each pipe wall with wall sections which are substantially parallel to each other and the inserts having corresponding parallel wall sections which engage parallel wall sections of the half-shell in which they are mounted so as to overlap therewith in an overlap region, and a seal arranged between mutually facing wall sections of each insert and the corresponding half-shell at an end of the wall overlap region which is remote from the corresponding intake duct.

2. An intake manifold according to claim 1, including a flange on at least one of the parallel wall sections at the end remote from the intake duct which engages the seal.

3. An intake manifold according to claim 2 wherein the flange which engages the seal is on an insert and extends at least along the mutually parallel wall sections of the insert and the corresponding half-shell.

4. An intake manifold according to claim 3 wherein the inner pipe walls of an intake duct are formed by at least two inserts engaging each other in the parting plane, wherein one of the half-shells has an outlet flange and the corresponding insert has inner pipe walls which extend from the outlet flange to the parting plane and which are sealed off from the central air-collecting region.

5. An intake manifold according to claim 4 wherein the inserts having the sealed-off inner pipe walls include flanges which extend along the parallel wall sections and also between the parallel wall sections at an end of the insert and which face a wall of the half-shell at an end of the insert which is associated with outlet flange.

6. An intake manifold according to claim 4 wherein one of the half-shells and a corresponding insert in that half-shell each have a receiving flange which extends along the parting plane and which has a U-shaped cross-section, and the other of the half-shells and a corresponding insert in that half-shell each have an insertion flange formed with a projection which engages a corresponding receiving flange.

7. An intake manifold according to claim 6 wherein each receiving flange which receives a corresponding projection has a channel which is wider than the projection in order to accommodate material displaced from the projection by friction welding.

8. An intake manifold according to claim 5 including inserts which are open to the central air-collecting region at a location spaced from the parting plane and which form intake openings for the intake ducts and which are connected in the parting plane to further inserts so as to form the intake ducts together with the further inserts.

9. An intake manifold according to claim 5 capable of installation in any of a series of similar internal combustion engines with at least differing displacements, wherein the position of the inflow openings relative to the parting plane and/or the overlap region which determines the cross-sectional area of the intake ducts is selected according to the engine displacement.

10. An intake manifold according to claim 1 wherein the seal extends along the length of the intake duct.

11. An intake manifold according to claim 1 wherein the seal comprises a flexible material.

* * * * *